US008665249B2

(12) United States Patent
Suh

(10) Patent No.: US 8,665,249 B2
(45) Date of Patent: Mar. 4, 2014

(54) ORGANIC LIGHT EMITTING DISPLAY DEVICE

(75) Inventor: Mi-Sook Suh, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 782 days.

(21) Appl. No.: 12/499,224

(22) Filed: Jul. 8, 2009

(65) Prior Publication Data

US 2010/0020059 A1 Jan. 28, 2010

(30) Foreign Application Priority Data

Jul. 23, 2008 (KR) ........................ 10-2008-0071532

(51) Int. Cl.
*G06F 3/038* (2013.01)
*G09G 5/00* (2006.01)

(52) U.S. Cl.
USPC ................................ 345/204; 345/55; 345/76

(58) Field of Classification Search
None
See application file for complete search history.

(56) References Cited

U.S. PATENT DOCUMENTS

| | | | | |
|---|---|---|---|---|
| 5,598,178 | A * | 1/1997 | Kawamori | 345/93 |
| 5,666,288 | A * | 9/1997 | Jones et al. | 716/55 |
| 5,894,293 | A * | 4/1999 | Hush et al. | 345/74.1 |
| 5,995,074 | A | 11/1999 | Kusafuka et al. | |
| 6,310,611 | B1 * | 10/2001 | Caldwell | 345/173 |
| 6,795,049 | B2 * | 9/2004 | Toyoshima et al. | 345/93 |
| 2002/0063305 | A1 * | 5/2002 | Koike | 257/529 |
| 2003/0174871 | A1 * | 9/2003 | Yoshioka et al. | 382/124 |
| 2003/0189853 | A1 * | 10/2003 | Tanizaki et al. | 365/200 |
| 2004/0155851 | A1 * | 8/2004 | Morii | 345/99 |
| 2004/0252542 | A1 * | 12/2004 | Hoya et al. | 365/145 |
| 2005/0093467 | A1 * | 5/2005 | Suh | 315/169.3 |
| 2005/0110852 | A1 * | 5/2005 | Lee et al. | 347/97 |
| 2005/0134337 | A1 * | 6/2005 | Lee et al. | 327/158 |
| 2006/0001789 | A1 * | 1/2006 | Ahn | 349/42 |
| 2006/0114399 | A1 * | 6/2006 | Kim | 349/139 |
| 2008/0068324 | A1 * | 3/2008 | Chung et al. | 345/98 |
| 2008/0068364 | A1 * | 3/2008 | Park et al. | 345/206 |
| 2008/0074704 | A1 * | 3/2008 | Ebisawa et al. | 358/302 |
| 2008/0111933 | A1 * | 5/2008 | Lee et al. | 349/38 |
| 2008/0135845 | A1 * | 6/2008 | Heo et al. | 257/59 |
| 2008/0158466 | A1 * | 7/2008 | Lee | 349/54 |
| 2008/0165110 | A1 * | 7/2008 | Kim et al. | 345/99 |
| 2008/0170009 | A1 * | 7/2008 | Eom | 345/76 |
| 2008/0192163 | A1 * | 8/2008 | Lee et al. | 349/46 |
| 2008/0297042 | A1 * | 12/2008 | Ahn et al. | 313/504 |
| 2009/0231532 | A1 * | 9/2009 | Yoshida | 349/151 |

FOREIGN PATENT DOCUMENTS

| | | |
|---|---|---|
| KR | 10-2004-0009102 | 1/2004 |

* cited by examiner

*Primary Examiner* — Amare Mengistu
*Assistant Examiner* — Antonio Xavier
(74) *Attorney, Agent, or Firm* — Christie, Parker & Hale, LLP

(57) ABSTRACT

An organic light emitting display device capable of ensuring the drive stability. The organic light emitting display includes a plurality of pixels; first signal supply lines respectively coupled to the pixels disposed in at least two horizontal lines; and second signal supply lines being lower in number than the first signal supply lines and respectively coupled to the pixels disposed in the horizontal lines includes a scan driver driving the first and second signal supply lines; a data driver driving data lines disposed in a direction that is crossed to the first and second signal supply lines; and a dummy pattern block providing dummy patterns so that loads of the second signal supply lines are identical to loads of the first signal supply lines.

20 Claims, 7 Drawing Sheets

ORGANIC LIGHT EMITTING DISPLAY DEVICE

CROSS-REFERENCE TO RELATED APPLICATIONS

This application claims the benefit of Korean Application No. 10-2008-0071532, filed Jul. 23, 2008, in the Korean Intellectual Property Office, the disclosure of which is incorporated herein by reference.

BACKGROUND OF THE INVENTION

1. Field of the Invention

Aspects of the present invention relate to an organic light emitting display device, and more particularly to an organic light emitting display device capable of ensuring the drive stability.

2. Description of the Related Art

In recent years, various light emitting diode display devices that are lighter and smaller than a cathode ray tube (CRT) have been developed. Such flat display panels include liquid crystal display devices (LCDs), field emission display devices (FEDs), plasma display panels (PDPs), organic light emitting display devices, etc.

Among the flat display panels, the organic light emitting display device displays an image by using organic light emitting diodes (OLEDs) that generate light by recombining of electrons and holes. Organic light emitting display devices have advantages such as a rapid response time and low power consumption.

FIG. 1 is a circuit diagram showing a pixel in a conventional organic light emitting display device.

Referring to FIG. 1, the pixel 4 of the organic light emitting display device includes an organic light emitting diode (OLED) and a pixel circuit 2 coupled to a data line (Dm) and a scan line (Sn) to control the organic light emitting diode (OLED).

An anode electrode of the organic light emitting diode (OLED) is coupled to the pixel circuit 2, and a cathode electrode of the organic light emitting diode (OLED) is coupled to a second power source (ELVSS). Such organic light emitting diodes (OLEDs) generate light with a predetermined brightness corresponding to an electric current supplied from the pixel circuit 2.

The pixel circuit 2 controls the amount of a current supplied to the organic light emitting diode (OLED) to correspond to a data signal supplied to the data line (Dm) when a scan signal is supplied to the scan line (Sn). For this purpose, the pixel circuit 2 includes a second transistor (M2) coupled between a first power source (ELVDD) and the organic light emitting diode (OLED), a second transistor (M2), a first transistor (M1) coupled between the data line (Dm) and the scan line (Sn), and a storage capacitor (Cst) coupled between a gate electrode and a first electrode of the second transistor (M2).

A gate electrode of the first transistor (M1) is coupled to the scan line (Sn), and a first electrode of the first transistor (M1) is coupled to the data line (Dm). A second electrode of the first transistor (M1) is coupled to one side terminal of the storage capacitor (Cst). Here, the first electrode is set as either of a source electrode or a drain electrode, and the second electrode is set as an electrode that is different from the first electrode. For example, when the first electrode is set as a source electrode, the second electrode is set as a drain electrode. When a scan signal is supplied from the scan line (Sn), the first transistor (M1) coupled to the scan line (Sn) and the data line (Dm) is turned on to supply a data signal supplied from the data line (Dm) to the storage capacitor (Cst). In this case, the storage capacitor (Cst) stores a voltage corresponding to a data signal.

A gate electrode of the second transistor (M2) is coupled to one side terminal of the storage capacitor (Cst), and a first electrode of the second transistor (M2) is coupled to the other side terminal of the storage capacitor (Cst) and the first power source (ELVDD). A second electrode of the second transistor (M2) is coupled to an anode electrode of the organic light emitting diode (OLED). The second transistor (M2) controls the amount of a current so that the current corresponds to a voltage value stored in the storage capacitor (Cst). The current flows from the first power source (ELVDD) to the second power source (ELVSS) via the organic light emitting diode (OLED). In this case, the organic light emitting diode (OLED) generates light corresponding to the amount of current capacity supplied from the second transistor (M2).

However, the pixel 4 of the conventional organic light emitting display device has a problem, in that it is difficult to display an image with a desired brightness due to the non-uniformity in a threshold voltage of the second transistor (M2) and the degradation of the organic light emitting diode (OLED). In order to solve the above problem, there has been proposed a pixel structure in which each of the pixels includes a plurality of transistors to compensate for the non-uniformity in the threshold voltage and/or the degradation of the organic light emitting diode (OLED). However, when each of the pixels includes a plurality of the transistors, the number of pixels to which some scan lines are coupled is different from the number of pixels to which other scan lines are coupled. In such a situation, the drive stability may deteriorate because various scan lines will have a non-uniform load.

SUMMARY OF THE INVENTION

Aspects of the present invention are designed to solve the above and/or other such drawbacks of the related art, and therefore aspects of the present invention provide an organic light emitting display device capable of ensuring the drive stability.

One embodiment of the present invention provides an organic light emitting display device including a plurality of pixels; first signal supply lines respectively coupled to the pixels disposed in at least two horizontal lines; second signal supply lines being lower in number than the first signal supply lines and respectively coupled to the pixels disposed in the horizontal lines, the organic light emitting display device including a scan driver driving the first signal supply lines and second signal supply lines; a data driver driving data lines disposed in a direction that crosses the first signal supply lines and second signal supply lines; and a dummy pattern block, wherein loads of the second signal supply lines are identical to loads of the first signal supply lines.

In this case, a length of the dummy pattern block may be set to a shorter length than a parallel length of the pixel. The dummy patterns may be made of a metal material that is different from a metal material of the second signal supply lines. The second signal supply lines may be made of a gate metal, and the dummy pattern may be formed of one of a source metal, a drain metal or a semiconductor layer. The dummy patterns may be electrically coupled to at least one of constant voltage sources supplied to the organic light emitting display device. The dummy patterns may be overlapped with the second signal supply lines so that the parasitic capacitance of the second signal supply lines is approximately identical to the parasitic capacitance of the first signal supply lines. The dummy pattern block may be disposed in at least one region of an upper portion and a lower portion of the panel except for the active region.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
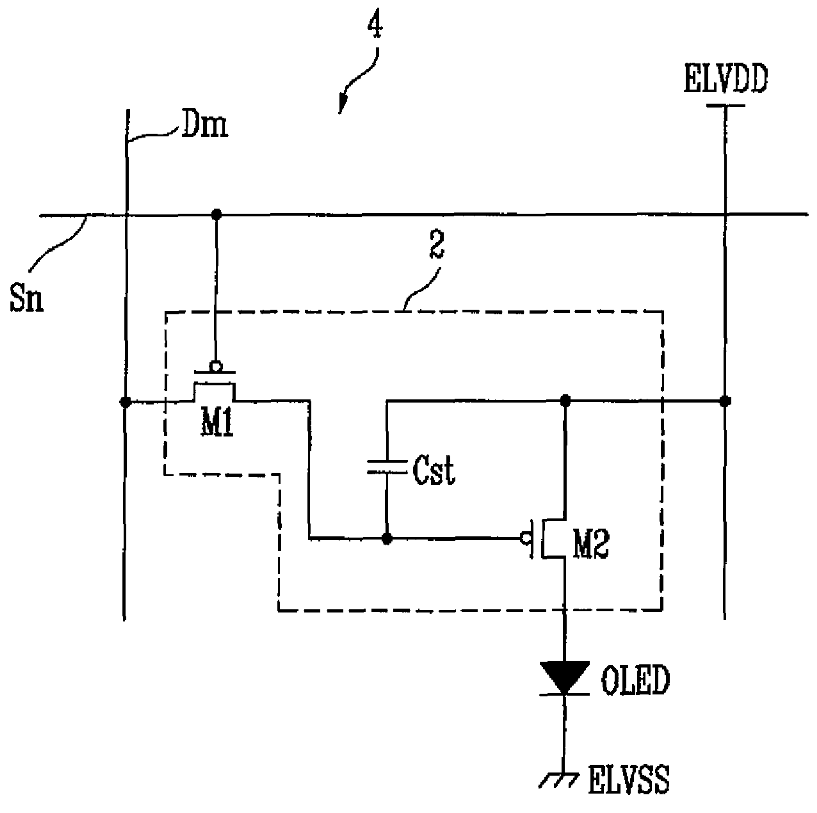
FIG. 1 (PRIOR ART)
FIG. 1 is a circuit diagram showing a conventional pixel.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
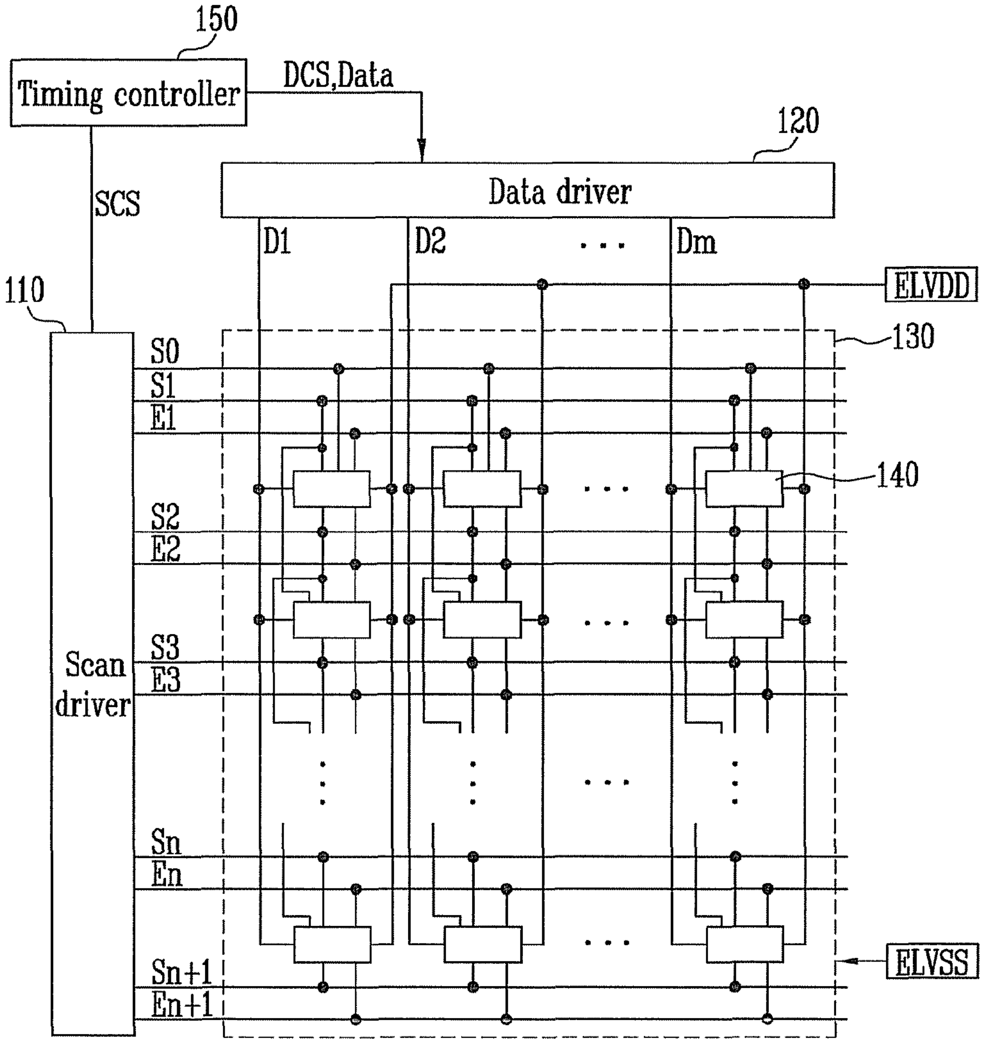
FIG. 2 is a diagram showing an organic light emitting display device according to one exemplary embodiment of the present invention.

FIG. 2 is a diagram showing an organic light emitting display device according to an exemplary embodiment of the present invention.

Referring to FIG. 2, the organic light emitting display device includes a pixel unit 130 including pixels 140 disposed in regions divided by scan lines (S0 through Sn+1), light emitting control lines (E1 through En+1) and data lines (D1 through Dm); a scan driver 110 driving scan lines (S0 through Sn+1) and light emitting control lines (E1 through En+1); a data driver 120 driving data lines (D1 through Dm); and a timing controller 150 controlling the scan driver 110 and the data driver 120.

The scan driver 110 receives a scan-drive control signal (SCS) from the timing controller 150. The scan driver 110 receiving the scan-drive control signal (SCS) generates a scan signal, and sequentially supplies the generated scan signal to the scan lines (S0 through Sn+1). Also, the scan driver 110 generates a light emitting control signal in response to the scan drive control signal (SCS), and sequentially supplies the generated light emitting control signal to the light emitting control lines (E1 to En+1).

Here, the light emitting control signal is set to a wider width than the scan signal. In fact, the light emitting control signal supplied to an $i^{th}$ (i is an integer) light emitting control line (Ei) is supplied so that it overlaps with a scan signal supplied to an $i-1^{st}$ scan line (Si−1) and an $i^{th}$ scan line (Si). The light emitting control signal is set to a polarity that is different from the scan signal. For example, when the scan signal is set to a low polarity, the light emitting control signal is set to a high polarity.

The data driver 120 receives a data-drive control signal (DCS) from the timing controller 150. The data driver 120 receiving the data drive control signal (DCS) generates a data signal, and supplies the generated data signal to the data lines (D1 through Dm) to synchronize with the scan signal.

The timing controller 150 generates a data drive control signal (DCS) and a scan drive control signal (SCS) to correspond to the synchronizing signals supplied from the outside. The data drive control signal (DCS) generated in the timing controller 150 is supplied to the data driver 120, and the scan drive control signal (SCS) is supplied to the scan driver 110. The timing controller 150 supplies externally supplied data (Data) to the data driver 120.

The pixel unit 130 receives a first power source (ELVDD) and a second power source (ELVSS) from the outside and then supplies the received first power source (ELVDD) and second power source (ELVSS) to each of the pixels 140. Each of the pixels 140 receiving the first power source (ELVDD) and the second power source (ELVSS) generates light corresponding to the data signal.

Such pixels 140 generate light with a desired brightness so as to compensate for the degradation of the organic light emitting diode (OLED) included in each of the pixels 140, and the threshold voltage of the drive transistor. For this purpose, a compensation unit compensating for the degradation of an organic light emitting diode and a pixel circuit compensating for the threshold voltage of a drive transistor are installed in each of the pixels 140.

Here, in order to drive the compensation unit and the pixel circuit, each pixel 140 is disposed on an $i^{th}$ horizontal line and coupled to an $i-1^{st}$ scan line (Si−1), and the pixel circuit includes an $i^{th}$ scan line (Si); an $i+1^{st}$ scan line (Si+1); an $i^{th}$ light emitting control line (Ei); and an $i+1^{st}$ light emitting control line.

Figure 3:
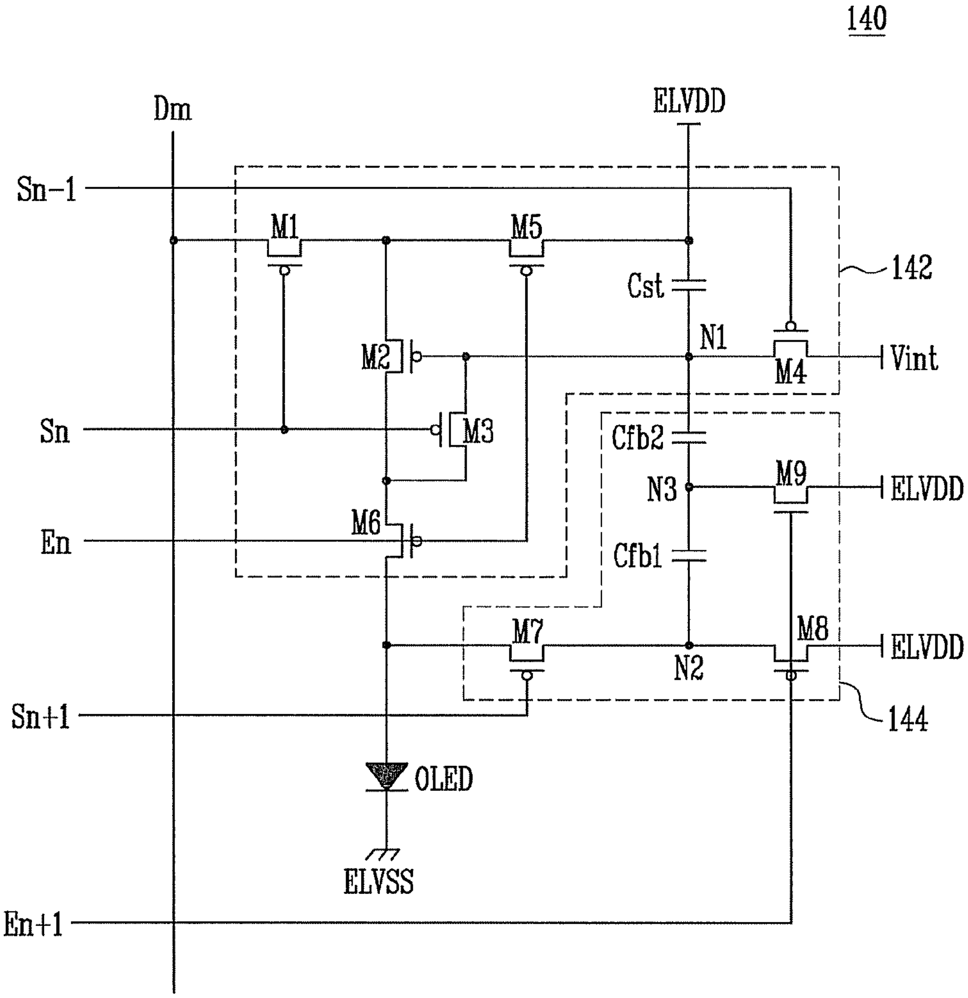
FIG. 3 is a circuit diagram showing a pixel according to an exemplary embodiment of the present invention as shown in FIG. 2.

FIG. 3 is a circuit diagram showing a pixel according to an embodiment of the present invention. FIG. 3 shows a pixel disposed on an $n^{th}$ horizontal line and coupled to an $m^{th}$ data line (Dm).

Referring to FIG. 3, the pixel 140 includes: an organic light emitting diode (OLED); a pixel circuit 142 compensating for a threshold voltage of a second transistor (M2) (i.e., a drive transistor) for supplying an electric current to the organic light emitting diode (OLED); and a compensation unit 144 compensating for the degradation of the organic light emitting diode (OLED).

An anode electrode of the organic light emitting diode (OLED) is coupled to the pixel circuit 142, and a cathode electrode of the organic light emitting diode (OLED) is coupled to a second power source (ELVSS). Such an organic light emitting diode (OLED) generates light with a predetermined brightness to correspond to the capacity of a current supplied from the second transistor (M2). Here, the first power source (ELVDD) has a higher voltage value than the second power source (ELVSS).

The pixel circuit 142 supplies an electric current to the organic light emitting diode (OLED), and simultaneously compensates for the threshold voltage of the second transistor (M2). For this purpose, the pixel circuit 142 includes first to sixth transistors (M1 to M6) and a storage capacitor (Cst).

A gate electrode of the first transistor (M1) is coupled to an $n^{th}$ scan line (Sn), and a first electrode of the first transistor (M1) is coupled to a data line (Dm). A second electrode of the first transistor (M1) is coupled to a first electrode of the second transistor (M2). When a scan signal is supplied to the $n^{th}$ scan line (Sn), such a first transistor (M1) is turned on to supply a data signal supplied to the data line (Dm) to the first electrode of the second transistor (M2).

A gate electrode of the second transistor (M2) is coupled to a first node (N1), and a first electrode of the second transistor (M2) is coupled to the second electrode of the first transistor (M1). A second electrode of the second transistor (M2) is coupled to a first electrode of the sixth transistor (M6). Such a second transistor (M2) supplies an electric current to the organic light emitting diode (OLED), the electric current corresponding to the voltage applied to the first node (N1).

A first electrode of the third transistor (M3) is coupled to the second electrode of the second transistor (M2), and a second electrode of the third transistor (M3) is coupled to the first node (N1). A gate electrode of the third transistor (M3) is coupled to an $n^{th}$ scan line (Sn). When a scan signal is supplied to the scan line (Sn), such a third transistor (M3) is turned on to couple the second transistors (M2) in a diode mode.

A first electrode of the fourth transistor (M4) is coupled to the first node (N1), and a second electrode of the fourth transistor (M4) is coupled to a reset power source (Vint). A gate electrode of the fourth transistor (M4) is coupled to an $n-1^{st}$ scan line (Sn−1). When a scan signal is supplied to an $n-1^{st}$ scan line (Sn−1), such a fourth transistor (M4) is turned on to reset a voltage of the first node (Ni) into a voltage of the reset power source (Vint).

A first electrode of the fifth transistor (M5) is coupled to the first power source (ELVDD), and a second electrode of the fifth transistor (M5) is coupled to the first electrode of the second transistor (M2). A gate electrode of the fifth transistor (M5) is coupled to an $n^{th}$ light emitting control line (En). When the supply of a light emitting control signal to the $n^{th}$ light emitting control line (En) is suspended, such a fifth transistor (M5) is turned on to electrically couple the first electrode of the second transistor (M2) to the first power source (ELVDD).

A first electrode of the sixth transistor (M6) is coupled to the second electrode of the second transistor (M2), and a second electrode of the sixth transistor (M6) is coupled to the organic light emitting diode (OLED). A gate electrode of the sixth transistor (M6) is coupled to the $n^{th}$ light emitting control line (En). When the supply of a light emitting control signal to the light emitting control line (En) is suspended, such a sixth transistor (M6) is turned on to electrically couple the organic light emitting diode (OLED) to the second transistor (M2).

The storage capacitor (Cst) is coupled between the first node (N1) and the first power source (ELVDD). Such a storage capacitor (Cst) charges a predetermined voltage to correspond to the voltage applied to the first node (N1).

The compensation unit 144 controls a voltage of the first node (N1) of the gate electrode of the second transistor (M2) to correspond to the degradation of the organic light emitting diode (OLED). That is to say, the compensation unit 144 compensates for the degradation of the organic light emitting diode (OLED) by controlling a voltage of the first node (N1) to a low voltage level as the organic light emitting diode (OLED) becomes more degraded. For this purpose, the compensation unit 144 includes seventh to ninth transistors (M7 to M9), a first feedback capacitor (Cfb1) and a second feedback capacitor (Cfb2).

A first electrode of the seventh transistor (M7) is coupled to a second node (N2), and a second electrode of the seventh transistor (M7) is coupled to an anode electrode of the organic light emitting diode (OLED). A gate electrode of the seventh transistor (M7) is coupled to an $n+1^{st}$ scan line (Sn+1). When a scan signal is supplied to the $n+1^{st}$ scan line (Sn+1), such a seventh transistor (M7) is turned on to electrically couple the organic light emitting diode (OLED) to the second node (N2).

A first electrode of the eighth transistor (M8) is coupled to the first power source (ELVDD), and a second electrode of the eighth transistor (M8) is coupled to the second node (N2). A gate electrode of the eighth transistor (M8) is coupled to an $n+1^{st}$ light emitting control line (En+1). When the supply of a light emitting control signal to the $n+1^{st}$ light emitting control line (En+1) is suspended, such an eighth transistor (M8) is turned on to electrically couple the second node (N2) to the first power source (ELVDD).

A first terminal of the first feedback capacitor (Cfb1) is coupled to the second node (N2), and a second terminal of the first feedback capacitor (Cfb1) is coupled to a third node (N3). The first feedback capacitor (Cfb1) changes a voltage of the third node (N3) to correspond to a changed voltage value of the second node (N2).

A first terminal of the second feedback capacitor (Cfb2) is coupled to the third node (N3), and a second terminal of the second feedback capacitor (Cfb2) is coupled to the first node (N1). The second feedback capacitor (Cfb2) changes a voltage of the first node (N1) to correspond to a changed voltage value of the third node (N3).

That is to say, the first feedback capacitor (Cfb1) and the second feedback capacitor (Cfb2) are both disposed between the second node (N2) and the first node (N1), and change a voltage of the first node (N1) to correspond to the changed voltage value of the second node (N2).

A first electrode of the ninth transistor (M9) is coupled to the first power source (ELVDD), and a second electrode of the ninth transistor (M9) is coupled to the third node (N3). A gate electrode of the ninth transistor (M9) is coupled to an $n+1^{st}$ light emitting control line (En+1). When a light emitting control signal is supplied to the $n+1^{st}$ light emitting control line (En+1), such a ninth transistor (M9) is turned on to electrically couple the first power source (ELVDD) to the third node (N3). Here, the ninth transistor (M9) is formed in a conductive type that is different from the other transistors (M1 through M8). For example, when the other transistors (M1 to M8) are formed in a PMOS type, the ninth transistor (M9) is formed in an NMOS type.

Figure 4:
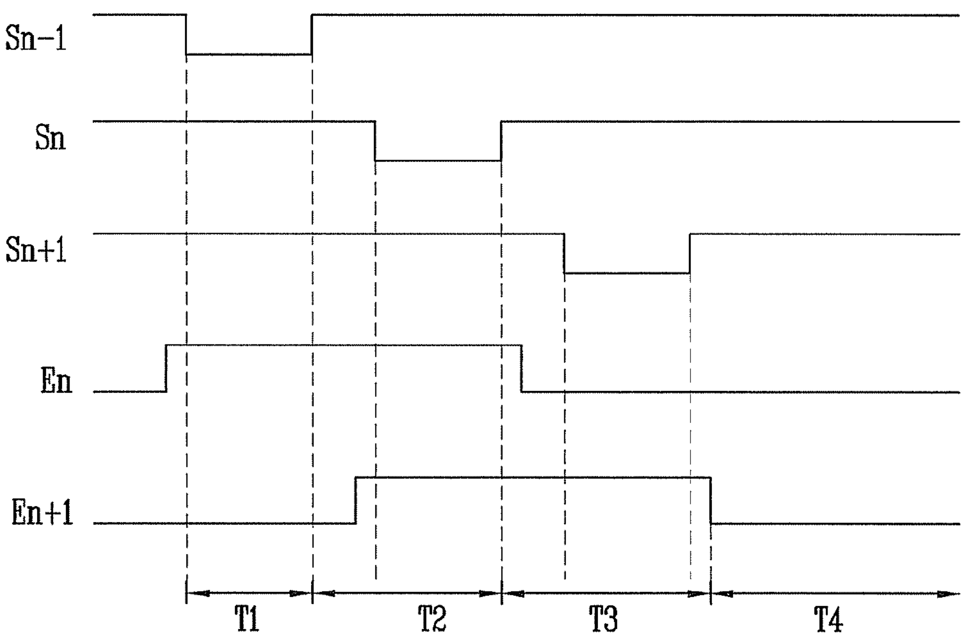
FIG. 4 is a waveform view showing a method of driving a pixel as shown in FIG. 3.

FIG. 4 is a waveform view showing a method of driving a pixel as shown in FIG. 3.

The method of driving a pixel will be described with respect to FIG. 3 and FIG. 4. First, a scan signal is supplied to an $n-1^{st}$ scan line (Sn−1) during a first period (T1), and a light emitting control signal is supplied to an $n^{th}$ light emitting control line (En).

When the light emitting control signal is supplied to the $n^{th}$ light emitting control line (En), the fifth transistor (M5) and the sixth transistor (M6) are turned off. When the scan signal is supplied to the $n-1^{st}$ scan line (Sn−1), the fourth transistor (M4) is turned on. When the fourth transistor (M4) is turned on, the first node (N1) is reset to a voltage of the reset power source (Vint). Here, the voltage value of the reset power source (Vint) is set to a lower voltage value than that of the data signal.

During a second period (T2), the supply of a scan signal to the $n-1^{st}$ scan line (Sn−1) is suspended and a scan signal is supplied to the $n^{th}$ scan line (Sn). Also, a light emitting control signal is supplied to an $n+1^{st}$ light emitting control line (En+1) during the second period (T2). When the supply of the scan signal to the $n-1^{st}$ scan line (Sn−1) is suspended, the fourth transistor (M4) is turned off. When the scan signal is supplied to the $n^{th}$ scan line (Sn), the first transistor (M1) and the third transistor (M3) are turned on.

When the third transistor (M3) is turned on, the second transistor (M2) is coupled as a diode. When the first transistor (M1) is turned on, the data signal supplied to the data line (Dm) is supplied to the first electrode of the second transistor (M2). Here, since a voltage of the first node (N1) is reset to a voltage of the reset power source (Vint) during the first period (T1), the second transistor (M2) is turned on. Therefore, the data signal supplied from the first transistor (M1) is supplied to the first node (N1) via the second transistor (M2) and the third transistor (M3). As such, a voltage corresponding to the data signal and the threshold voltage of the second transistor (M2) is applied to the first node (NI), and the storage capacitor (Cst) charges a predetermined voltage corresponding to the voltage applied to the first node (N1).

Meanwhile, when a light emitting control signal is supplied to an n+1$^{st}$ light emitting control line (En+1), the ninth transistor (M9) is turned on, and the eighth transistor (M8) is turned off. When the ninth transistor (M9) is turned on, a first power source (ELVDD) is supplied to the third node (N3). That is to say, the third node (N3) maintains a constant voltage of the first power source (ELVDD) during a period that a voltage corresponding to the data signal is applied to the first node (N1).

The supplies of a light emitting control signal to be supplied to the n$^{th}$ light emitting control line (En) and a scan signal to be supplied to the n$^{th}$ scan line (Sn) are suspended during a third period (T3). A scan signal is supplied to the n+1$^{st}$ scan line (Sn+1) during the third period (T3).

When the supply of the scan signal to the n$^{th}$ scan line (Sn) is suspended, the first transistor (M1) and the third transistor (M3) are turned off. When the supply of the light emitting control signal that will be supplied to the n$^{th}$ light emitting control line (En) is suspended, the fifth transistor (M5) and the sixth transistor (M6) are turned on. When the fifth transistor (M5) and the sixth transistor (M6) are turned on, the first power source (ELVDD), the fifth transistor (M5), the second transistor (M2), the sixth transistor (M6) and the organic light emitting diode (OLED) are electrically coupled to each other. As such, the second transistor (M2) supplies an electric current to the organic light emitting diode (OLED), the electric current corresponding to the voltage applied to the first node (N1).

Meanwhile, the seventh transistor (M7) maintains a turned-on state during the third period (T3) to correspond to the scan signal supplied to the n+1$^{st}$ scan line (Sn+1). Therefore, the second node (N2) receives a voltage (Voled) applied to the organic light emitting diode (OLED) during the third period (T3).

The supplies of a scan signal that will be supplied to the n+1$^{st}$ scan line (Sn+1) and a light emitting control signal that will be supplied to the n+1$^{st}$ light emitting control line (En+1) are suspended during a fourth period (T4). When the supply of the scan signal to the n+1$^{st}$ scan line (Sn+1) is suspended, the seventh transistor (M7) is turned off. When the supply of the light emitting control signal to the n+1$^{st}$ light emitting control line (En+1) is suspended, the ninth transistor (M9) is turned off, and the eighth transistor (M8) is simultaneously turned on.

When the eighth transistor (M8) is turned on, a voltage of the second node (N2) is increased from a voltage of the organic light emitting diode (Voled) to a voltage of the first power source (ELVDD). In this case, since the ninth transistor (M9) is turned off, that is, since the third node (N3) is set to a floating state, a voltage of the third node (N3) is also increased to correspond to the increased voltage value of the second node (N2). Similarly, a voltage of the first node (N1) that is set to a floating state is also increased to a predetermined voltage to correspond to the increased voltage value of the third node (N3). That is to say, the voltage of the first node (N1) is controlled to correspond to the increased voltage value of the second node (N2) during the fourth period (T4). Subsequently, the second transistor (M2) supplies an electric current to the organic light emitting diode (OLED), the electric current corresponding to the voltage applied to the first node (N1).

Meanwhile, the organic light emitting diode (OLED) is degraded with time. When the organic light emitting diode (OLED) is degraded, the voltage applied as the voltage of the organic light emitting diode (Voled) is increased. That is to say, when an electric current is supplied to the organic light emitting diode (OLED), the voltage applied as the voltage of the organic light emitting diode (Voled) is increased as the organic light emitting diode (OLED) becomes degraded. Therefore, the increased voltage value of the second node (N2) decreases as the organic light emitting diode (OLED) becomes degraded.

More particularly, the voltage of the organic light emitting diode (Voled) that is supplied to the second node (N2) is increased as the organic light emitting diode (OLED) becomes degraded. The increase in the voltage applied as the voltage of the organic light emitting diode (Voled) results in the reduction of the increased voltage of the second node (N2) when a voltage of the first power source (ELVDD) is supplied to the second node (N2). When the increased voltage of the second node (N2) is reduced, the increased voltage values of the third node (N3) and the first node (N1) are also decreased. Then, the capacity of a current supplied from the second transistor (M2) to the organic light emitting diode (OLED) is increased to correspond to the same data signal. That is to say, the current capacity supplied from the second transistor (M2) is increased in the present invention as the organic light emitting diode (OLED) becomes degraded. Therefore it is possible to compensate for the degradation of the brightness caused by the degradation of the organic light emitting diode (OLED).

Figure 5:
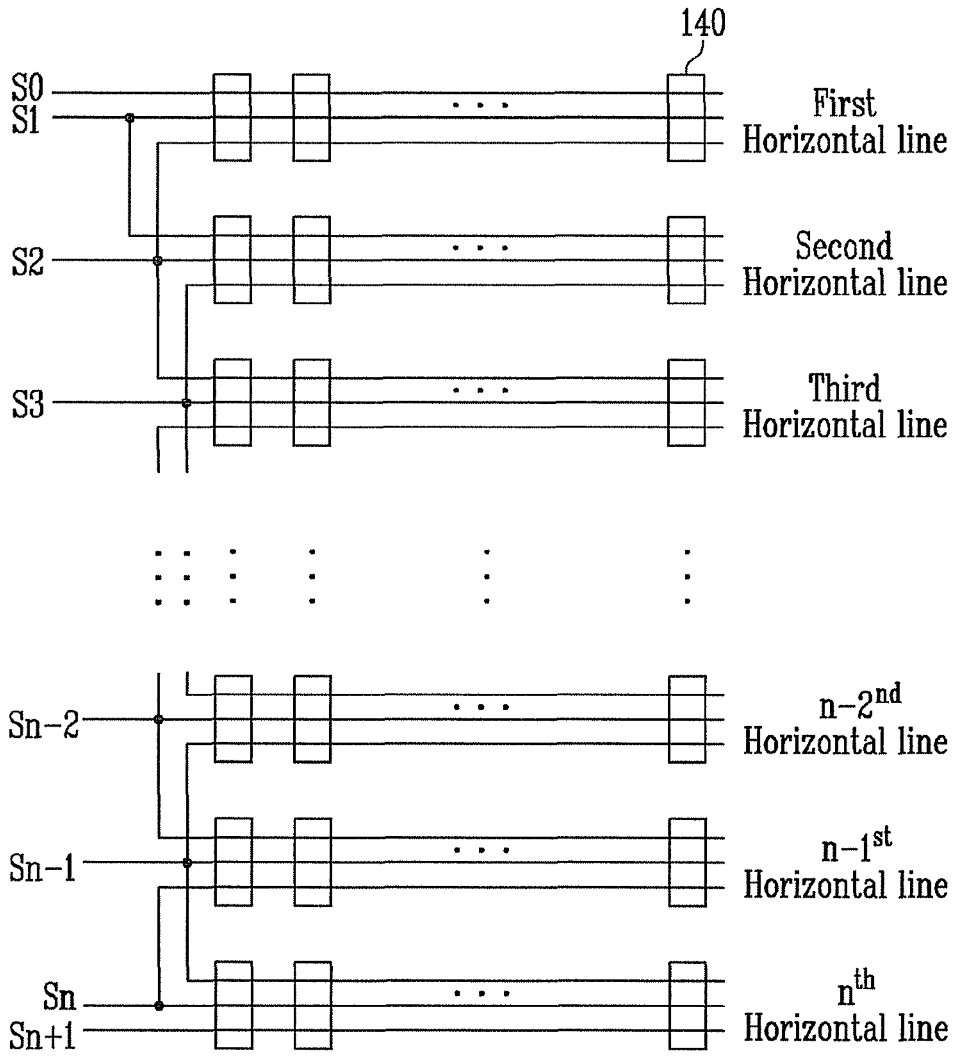
FIG. 5 is a diagram showing loads of scan lines as shown in FIG. 2.

FIG. 5 is a diagram showing loads of scan lines as shown in FIG. 2.

Referring to FIG. 5, the second scan line (S2) to the n−1$^{st}$ scan line (Sn−1) (for example, first signal supply lines) are coupled to the pixels 140 disposed on 3 horizontal lines. That is to say, each of the second scan line (S2) to the n−1$^{st}$ scan line (Sn−1) are disposed on 3 horizontal lines, and therefore it has a load corresponding to the 3 horizontal lines.

More particularly, each of the scan lines (S) coupled to the pixels 140 is disposed so that it can be overlapped with a plurality of metal materials (for example, data lines (D1 to Dm) and power source lines), which leads to the generation of a predetermined parasitic capacitance. In this case, each of the scan lines from the second scan line (S2) through the n−1$^{st}$ scan line (Sn−1) has a parasitic capacitance corresponding to the 3 horizontal lines.

The first scan line (S1) and the n$^{th}$ scan line (Sn) are coupled to the pixels 140 disposed on 2 horizontal lines. That is to say, each of the first scan line (S1) and the n$^{th}$ scan line (Sn) is disposed on the 2 horizontal lines, and therefore it has a parasitic capacitance corresponding to the 2 horizontal lines. For example, the parasitic capacitance of each of the first scan line (S1) and the n$^{th}$ scan line (Sn) is set to a lower parasitic capacitance than that of the second scan line (S2).

The zeroth scan line (S0) and the n+1$^{st}$ scan line (Sn+1) are coupled to the pixels 140 disposed on one horizontal line. That is to say, each of the zeroth scan line (S0) and the n+1$^{st}$ scan line (Sn+1) are disposed on one horizontal line, and therefore have parasitic capacitances corresponding to the one horizontal line. For example, each of the zeroth scan line (S0) and the n+1$^{st}$ scan line (Sn+1) are set to a lower parasitic capacitance capacity than that of the first scan line (S1)

As described above, the zeroth scan line (S0), the first scan line (S1), the n$^{th}$ scan line (Sn) and the n+1$^{st}$ scan line (Sn+1) (for example, second signal supply lines) have loads that are different from the second scan line (S2) through the n−1$^{st}$ scan line (Sn−1). When the scan lines (S) have different loads, as described above, the drive stability may be deteriorated. For example, the scan signal supplied to the zeroth scan line (S0) has a supply time (i.e. a falling and rising time is set to different time values) that is different from the scan signal supplied to the second scan line (S2), and the scan signal supplied to the first scan line (S1) has a supply time that is different from the scan signal supplied to the zeroth scan line (S0) and the second scan line (S2). A panel as shown in FIG. 6 is proposed in the present invention to overcome the above problems.

Figure 6:
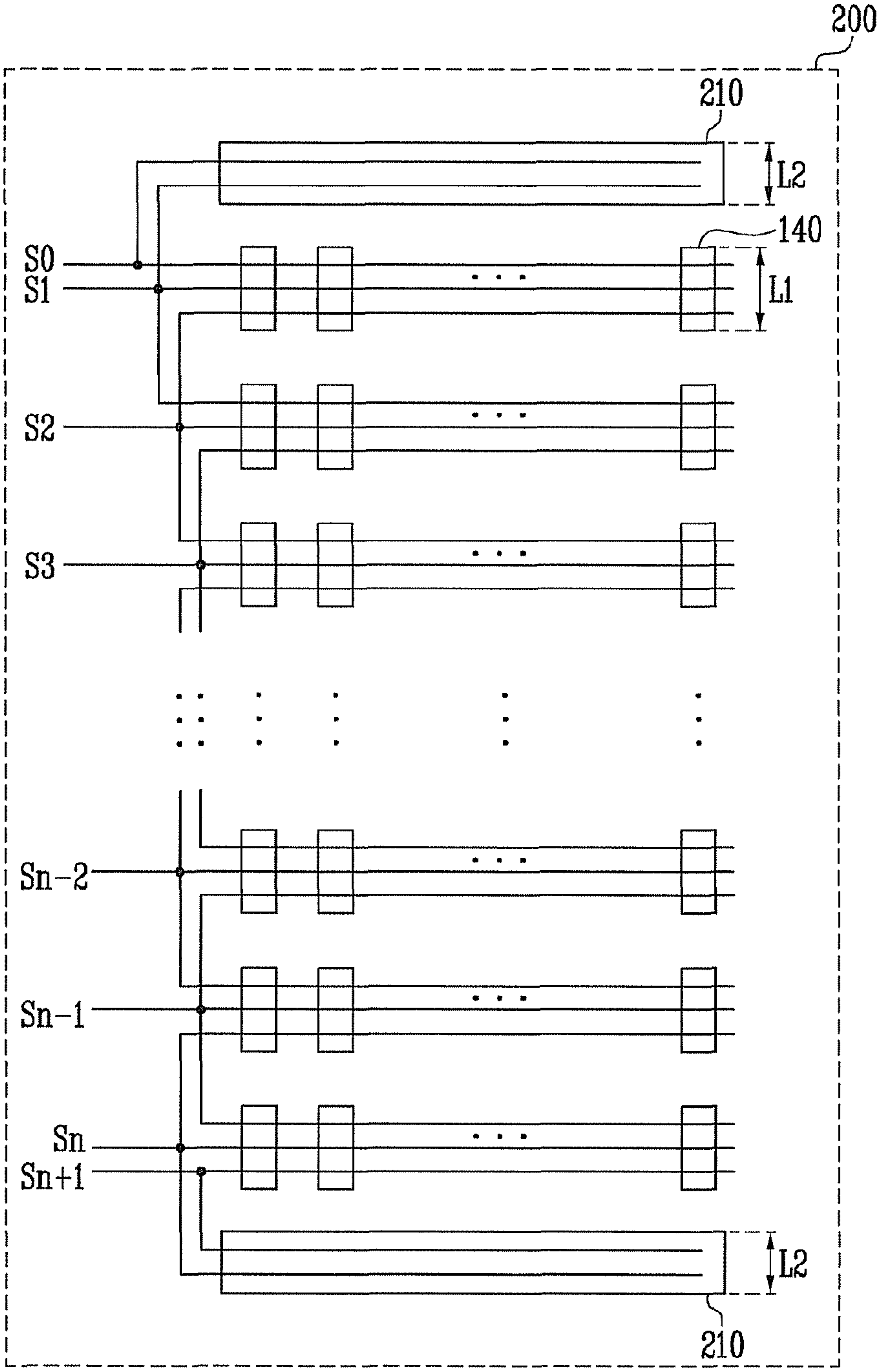
FIG. 6 is a diagram showing a panel according to one exemplary embodiment of the present invention.

FIG. 6 is a diagram showing a panel according to one exemplary embodiment of the present invention.

Referring to FIG. 6, the panel 200 according to one exemplary embodiment of the present invention includes dummy pattern blocks 210 disposed on an upper portion and a lower portion of each of the pixels 40. Here, the dummy pattern blocks 210 are disposed in a region except for an active region.

The dummy pattern block 210 disposed on the upper portion of each of the pixels 40 is coupled to a zeroth scan line (S0) and a first scan line (S1) to provide a dummy pattern so that loads of the zeroth scan line (S0) and the first scan line (S1) can be identical to the second scan line (S2).

The dummy pattern block 210 disposed on the lower portion of each of the pixels 40 is coupled to an n$^{th}$ scan line (Sn) and an n+1$^{st}$ scan line (Sn+1) to provide a dummy pattern so that loads of the n$^{th}$ scan line (Sn) and the n+1$^{st}$ scan line (Sn+1) can be identical to loads of the second scan line (S2).

Figure 7:
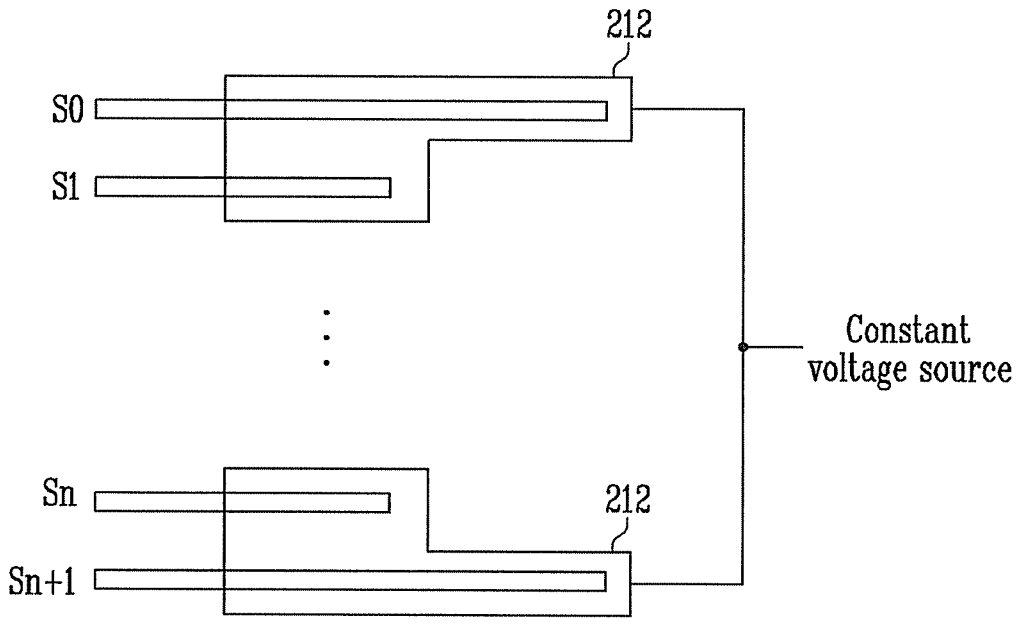
FIG. 7 is a diagram showing a dummy pattern block as shown in FIG. 6.

For this purpose, each of the dummy pattern blocks 210 includes a dummy pattern. The dummy pattern further provides parasitic capacitance so that the load of the zeroth scan line (S0) (or the n+1$^{st}$ scan line (Sn+1)) can be identical to the load of the second scan line (S2). Also, the dummy pattern is further provided with parasitic capacitance so that the load of the first scan line (S1) (or the n$^{th}$ scan line (Sn)) can be identical to the load of second scan line (S2). For example, since a dummy pattern 212 as shown in FIG. 7 is installed in the dummy pattern block 210, the dummy pattern further provides parasitic capacitance so that the loads of the zeroth scan line (S0) (or n+1$^{st}$ scan line (Sn+1)) and the first scan line (S1) (or n$^{th}$ scan line (Sn)) can be identical to the load of the second scan line (S2). In this case, the loads of all the scan lines (S0 to Sn+1) are set to an approximately same load level, and therefore it is possible to ensure the drive stability.

Meanwhile, FIG. 7 shows that the dummy pattern 212 is formed as a plate, but the present invention is not particularly limited thereto. In fact, the dummy pattern 212 further provides parasitic capacitance, and may be formed in various shapes (for example, zigzag, triangle, oval, mosaic shapes, and other geometric forms, etc.). The dummy pattern is made of a material that is different from a gate metal of which the scan lines (S) are formed. For example, the dummy pattern 212 may be formed of a source/drain metal or a semiconductor layer.

In addition, the dummy pattern 212 is coupled to a constant voltage source. When the dummy pattern 212 is not coupled to the constant voltage source, the problem is that the parasitic capacitor further provided by the dummy pattern 212 may be set to a floating state. To address such, the dummy pattern 212 stably provides the parasitic capacitance by coupling the dummy pattern 212 to a constant voltage source in the present invention. The constant voltage source may be set to one of the voltages supplied to the panel 200. For example, the constant voltage source may be set to one of the first power source (ELVDD), the second power source (ELVSS) and the reset power source (Vint).

Meanwhile, an organic light emitting diode and the like are not formed inside the dummy pattern block 210. That is to say, only a dummy pattern having a predetermined shape is formed inside the dummy pattern block 210. Therefore, as shown in FIG. 6, a length L2 of the dummy pattern block 210 is set to a lower length than a parallel length (L1) of the pixel 140. In this case, since the size of a region where power is wasted by the dummy pattern block 210 is minimized, it is possible to prevent the increase in the perpendicular length of the panel 200.

As described above, the dummy pattern block 210 has been described to match the load of the scan lines (S0, S1, Sn, and Sn+1), but the present invention is not particularly limited thereto. For example, a load of the n+1$^{st}$ light emitting control line (En+1) is different from loads of the other light emitting control lines (E1 to En), as shown in FIG. 2. In this case, a dummy pattern may be further formed so that the n+1$^{st}$ light emitting control line (En+1) and the other light emitting control lines (E1 to En) can be identical to each other.

Also, the pixel structure is defined in the structure as shown in FIG. 3 according to aspects of the present invention. In fact, the present invention is applicable when some first signal supply lines of the scan lines and/or light emitting control lines (i.e., signal supply lines to supply a signal) are coupled to the pixels disposed on at least two horizontal lines, and the other second signal supply lines except for the first signal supply lines are lower in number than the first signal supply lines and coupled to the pixels disposed on the horizontal lines.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic light emitting display device comprising:
- a plurality of pixels arranged in a plurality of rows and a plurality of columns;
- first signal supply lines, each of the first signal supply lines being coupled to at least two rows of pixels from among the plurality of rows of pixels;
- second signal supply lines each being coupled to a fewer number of rows of pixels from among the plurality of rows of pixels than the number of rows of pixels each first signal supply line is coupled to;
- a scan driver for driving the first signal supply lines and second signal supply lines;
- a data driver for driving data lines disposed in a direction that crosses the first signal supply lines and second signal supply lines; and
- a dummy pattern block for providing a parasitic capacitance to each of the second signal supply lines so that a total parasitic capacitance of each of the second signal supply lines is substantially identical to a total parasitic capacitance of each of the first signal supply lines,
- wherein each of the second signal supply lines is coupled to at least one row of pixels.

2. The organic light emitting display device according to claim 1, wherein a length of the dummy pattern block is a shorter length than a parallel length of the pixels.

3. The organic light emitting display device according to claim 1, wherein the dummy patterns are made of a metal material that is different from a metal material of the second signal supply lines.

4. The organic light emitting display device according to claim 3, wherein the second signal supply lines are made of a gate metal, and the dummy pattern is formed of one of a source metal, a drain metal or a semiconductor layer.

5. The organic light emitting display device according to claim 1, wherein the dummy patterns are electrically coupled to at least one constant voltage source supplied to the organic light emitting display device.

6. The organic light emitting display device according to claim 1, wherein the dummy patterns are overlapped with the second signal supply lines so that parasitic capacitance of the second signal supply lines is approximately identical to parasitic capacitance of the first signal supply lines.

7. The organic light emitting display device according to claim 1, wherein the dummy pattern block is disposed in at least one region of an upper portion and a lower portion of a panel except for an active region.

8. The organic light emitting display device according to claim 1, wherein:

at least a portion of each of the second signal supply lines coupled to the pixels is at an active region, and at least a portion of each of the second signal supply lines coupled to the dummy pattern block is outside of the active region.

9. The organic light emitting display device according to claim 1, wherein:

the dummy pattern block overlaps at least one second signal supply line of the second signal supply lines for a first length in a horizontal direction of the at least one second signal supply line, one of the pixels overlaps the at least one second signal supply line for a second length in the horizontal direction of the at least one second signal supply line, and the first length is greater than the second length.

10. The organic light emitting display device according to claim 1, wherein:

the dummy pattern block has an outer maximum width in a direction parallel to the horizontal lines, each of the pixels has an outer maximum width in a direction parallel to the horizontal lines, and the outer maximum width of each of the pixels is less than the outer maximum width of the dummy pattern block.

11. The organic light emitting display device according to claim 1, wherein each of the first signal supply lines is coupled to at least three rows of pixels from among the plurality of rows of pixels, and wherein each of the second signal supply lines is coupled to at least two rows of pixels from among the plurality of rows of pixels.

12. The organic light emitting display device according to claim 1, wherein an organic light emitting diode and the like are not formed inside the dummy pattern block.

13. A method of stably driving an organic light emitting display device comprising a plurality of pixels arranged in a plurality of rows and a plurality of columns; first signal supply lines, each of the first signal supply lines being coupled to at least two rows of pixels from among the plurality of rows of pixels; second signal supply lines each being coupled to a fewer number of rows of pixels from among the plurality of rows of pixels than the number of rows of pixels each first signal supply line is coupled to, wherein each of the second signal supply lines is coupled to at least one row of pixels; the method of stably driving the organic light emitting display device comprising:

driving the first signal supply lines and second signal supply lines with a scan driver;

driving data lines with a data driver, wherein the data lines are disposed across the first signal supply lines and second signal lines; and supplying a parasitic capacitance to each of the second signal supply lines to provide a substantially equal parasitic capacitance to each of the first signal supply lines and the second signal supply lines to stably drive the plurality of pixels.

14. The method of claim 13, wherein the providing of the equal parasitic capacitance comprises a dummy pattern block providing a dummy pattern so that loads of the first signal supply lines and loads of the second signal supply lines are identical.

15. The method of claim 14, wherein the dummy pattern block comprises a length of the dummy pattern block being shorter than a parallel length of the pixels.

16. The method of claim 14, wherein the dummy patterns are made of a metal material that is different from a metal material of the second signal supply lines.

17. The method of claim 16, wherein the second signal supply lines are made of a gate metal, and the dummy pattern is formed of one of a source metal, a drain metal or a semiconductor layer.

18. The method of claim 14, wherein the dummy patterns are electrically coupled to at least one constant voltage source supplied to the organic light emitting display device.

19. The method of claim 14, wherein the dummy patterns are overlapped with the second signal supply lines so that parasitic capacitance of the second signal supply lines can be identical to parasitic capacitance of the first signal supply lines.

20. The method of claim 14, wherein the dummy pattern block is disposed in at least one region of an upper portion and a lower portion of a panel except for an active region.

* * * * *